Figure 1:
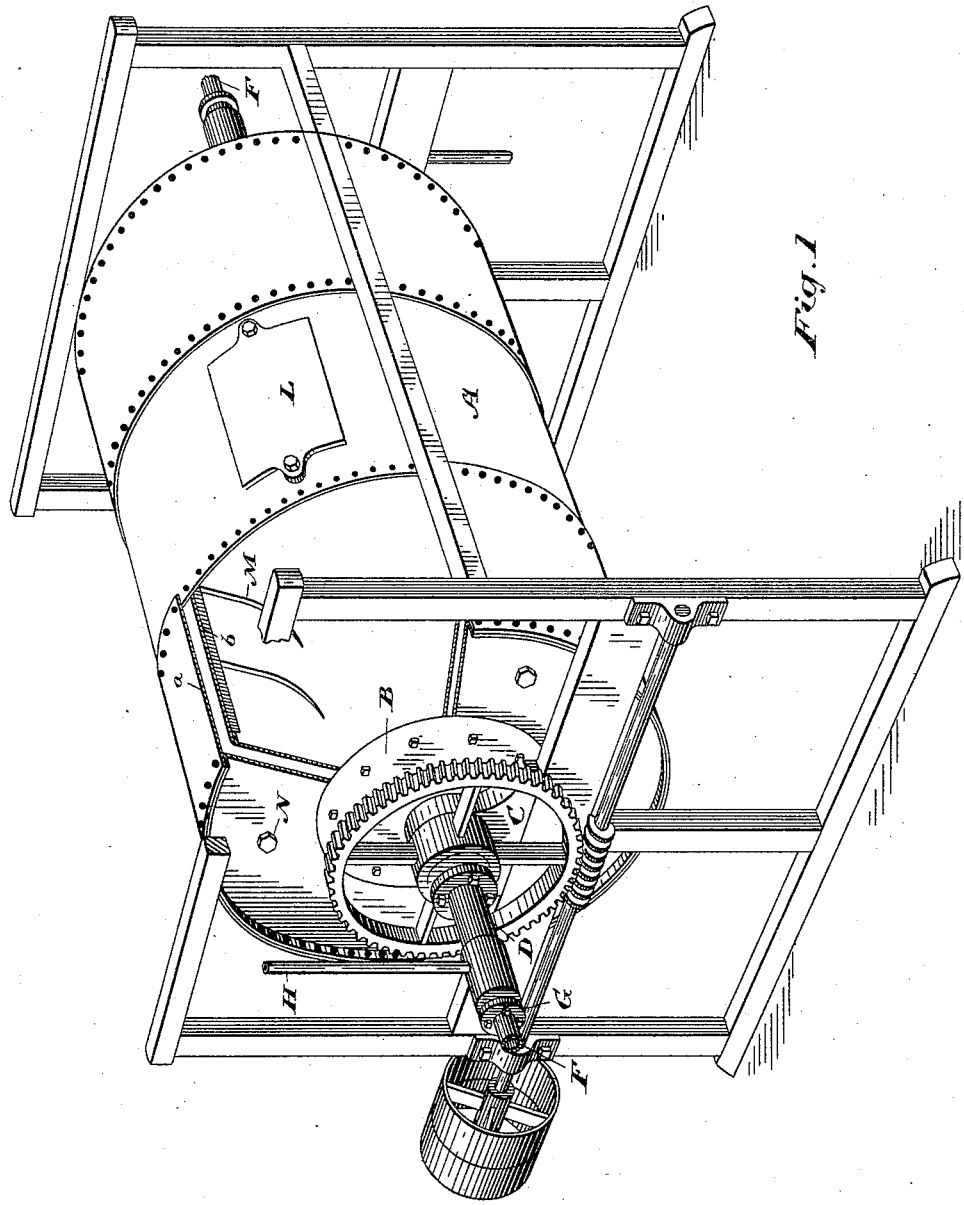

(No Model.) 2 Sheets—Sheet 1.

D. COLE & J. PEDDER.
APPARATUS FOR CARBONIZING VEGETABLE FIBER IN WOOL.

No. 443,358. Patented Dec. 23, 1890.

Witnesses

Inventors (No Model.) 2 Sheets—Sheet 2.
D. COLE & J. PEDDER.
APPARATUS FOR CARBONIZING VEGETABLE FIBER IN WOOL.
No. 443,358. Patented Dec. 23, 1890.
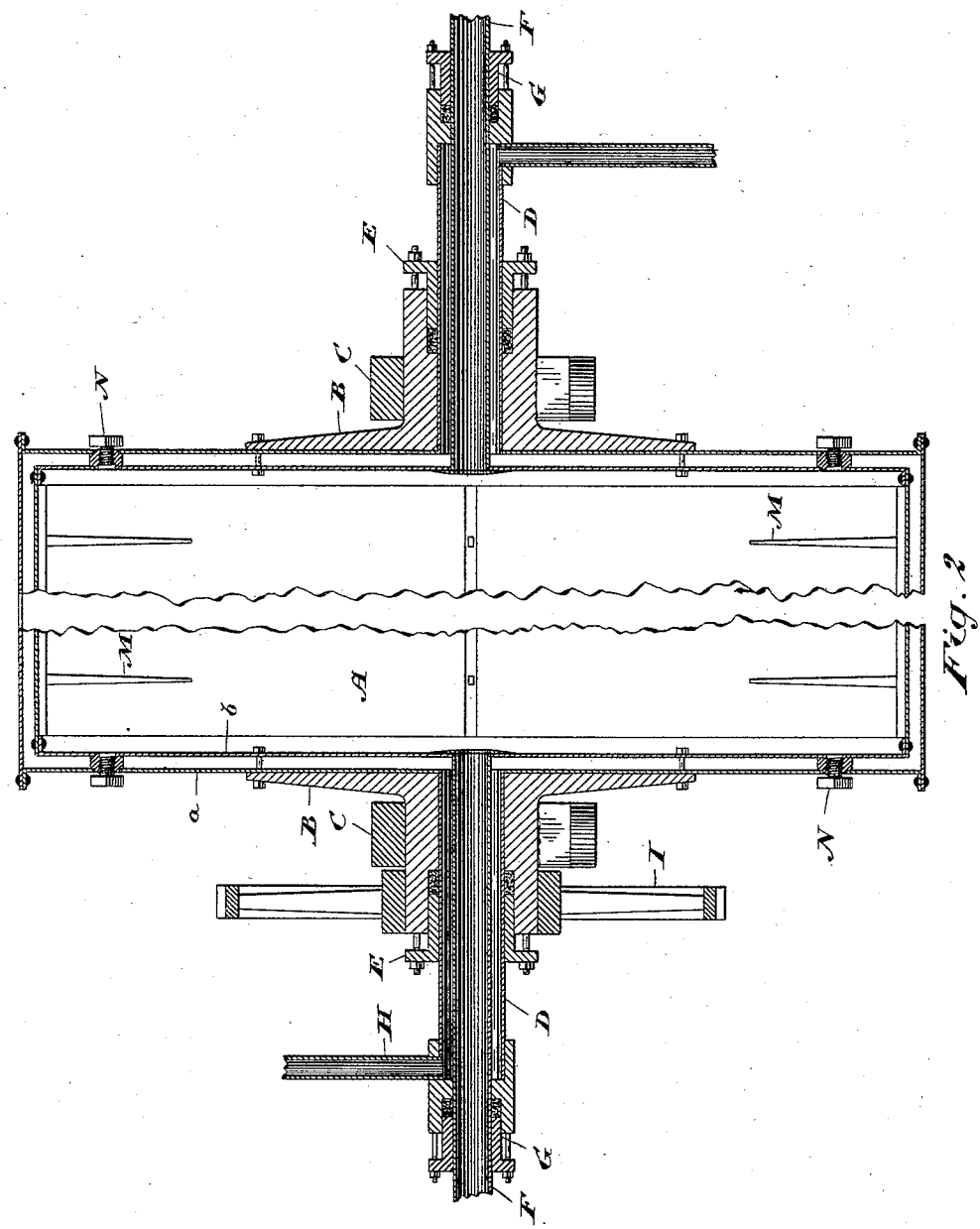

UNITED STATES PATENT OFFICE.

DAVID COLE AND JOSHUA PEDDER, OF DOON, ONTARIO, CANADA.

APPARATUS FOR CARBONIZING VEGETABLE FIBER IN WOOL.

SPECIFICATION forming part of Letters Patent No. 443,358, dated December 23, 1890.

Application filed April 11, 1890. Serial No. 347,455. (No model.)

*To all whom it may concern:*

Be it known that we, DAVID COLE and JOSHUA PEDDER, both manufacturers, and both of the village of Doon, in the county of Waterloo, in the Province of Ontario, Canada, have invented an Improved Combined Carbonizing and Drying Machine, of which the following is a specification.

The object of the invention is to provide a machine which will perform its work quickly and satisfactorily with the least possible amount of manual labor; and it consists in the peculiar construction, arrangement, and combinations of parts hereinafter more particularly described, and then definitely pointed out in the claim.

Figure 1 is a perspective view of our improved machine. Fig. 2 is a sectional elevation of the same.

Our invention produces an improved machine for carbonizing or destroying vegetable matter, such as cotton and jute contained in rags and piece-goods composed of cotton and woolen, also for destroying burrs, seeds, straw, or other vegetable matter contained in or mixed with woolen waste or other fibrous material.

A is a cylinder formed by an inner and outer skin $a$ and $b$, a space being left between the two skins. At each end of the cylinder A we rivet or otherwise secure a trunnion B, each of which is suitably supported in a bearing-box C. Each trunnion is bored out to receive a pipe D, which is arranged to communicate with the space between the skins $a$ and $b$, but is closed from communicating with the interior of the cylinder A. A stuffing-box E is formed in the end of the trunnion B, so that the steam will not leak out between the trunnion B and the pipe D.

F is a gas-pipe leading from the gas-retort to the interior of the cylinder A.

G is a stuffing-box formed in the end of the pipe D to prevent the gas escaping from the cylinder A.

H is a steam-pipe, forming a connection between the steam-boiler and the pipe D, which conducts the steam into the space between the skins $a$ and $b$.

I is a gear-wheel keyed or otherwise secured to the trunnion B.

J is a worm secured to the shaft K, and is carried in suitable bearings and has suitable loose and driving pulleys, as indicated.

L is a door made in the cylinder A for the admission and discharge of the material in or from the cylinder A.

M is a series of fingers extending inwardly from and fixed to the inner skin $a$ of the cylinder.

A suitable platform should be erected so that the door L may be easily reached for charging the cylinder A with the rags or other material to be carbonized. When the said material is to be discharged, the cylinder A is turned so that the mouth of the door L will be upon the bottom side, when the material in the said cylinder would naturally fall out or may be easily raked out without the necessity of any one entering the said cylinder. The steam which is admitted through the pipes D and H into the space between the skins $a$ and $b$ by acting directly upon the inner skin $a$ quickly heats the interior of the cylinder A, and the steam which empties at one end of the cylinder A through the pipes D and H escapes out of the other end of the cylinder through corresponding pipes, and what is left of the burning gas which enters through the pipe F at one end of the cylinder A escapes through a corresponding pipe located at the opposite end of the said cylinder.

When the machine is to be used as a drier, the plugs N at one end of the cylinder are removed; and the gas-pipe at the other end of the cylinder is connected with an exhaust-fan.

The cylinder A is heated by steam in the same manner as though the machine were used for carbonizing, and by the action of the exhaust-fan a constant current is drawn through the material in the cylinder, thereby quickly drying the said material.

What we claim as our invention is—

An improved carbonizer consisting of a revoluble double cylinder A, having a space formed around it between the inner skin $a$ and the outer skin $b$, and both skins constructed to revolve together, a steam-pipe or passage-way connecting the said space with a steam-boiler and extending through the trunnion on which the cylinder is journaled, and a gas-pipe or passage-way extending through the trunnion and connecting the gas-retort with the interior of the cylinder, substantially as and for the purpose specified.

Doon, February 14, 1890.

DAVID COLE.
JOSHUA PEDDER.

In presence of—
ALEXANDER MILLAR,
H. J. SIMS.